United States Patent [19]
Ogawa

[11] Patent Number: 5,130,962
[45] Date of Patent: Jul. 14, 1992

[54] TRACKING CONTROL ARRANGEMENT FOR INFORMATION SIGNAL REPRODUCING APPARATUS

[75] Inventor: Masahiko Ogawa, Tokyo, Japan

[73] Assignee: Canon Kabushiki Kaisha, Tokyo, Japan

[21] Appl. No.: 644,681

[22] Filed: Jan. 22, 1991

Related U.S. Application Data

[63] Continuation of Ser. No. 355,055, May 15, 1989, abandoned, which is a continuation of Ser. No. 217,043, Jul. 7, 1988, abandoned, which is a continuation of Ser. No. 756,061, Jul. 17, 1985, abandoned.

[30] Foreign Application Priority Data

Jul. 24, 1984 [JP] Japan .................. 59-154700
Jul. 24, 1984 [JP] Japan .................. 59-154701

[51] Int. Cl.$^5$ .............................................. G11B 7/00
[52] U.S. Cl. ................................ 369/32; 369/44.28
[58] Field of Search .......... 360/78.04, 78.08, 78.13, 360/77.06; 369/32, 33, 44.27, 44.28

[56] References Cited

U.S. PATENT DOCUMENTS

| | | | |
|---|---|---|---|
| 4,103,314 | 7/1978 | Case ........................... | 360/78 |
| 4,106,058 | 8/1978 | Romeas et al. .............. | 369/32 |
| 4,236,232 | 11/1980 | Jansen et al. ............... | 369/32 |
| 4,445,153 | 4/1984 | Fujimoto et al. ........... | 360/77.06 |
| 4,485,418 | 11/1984 | Bremmer ..................... | 360/77 |
| 4,499,510 | 2/1985 | Harding et al. ............. | 360/78 X |
| 4,506,355 | 3/1985 | Dakin et al. ................ | 369/32 |
| 4,544,969 | 10/1985 | Painton ....................... | 360/77 X |
| 4,555,736 | 11/1985 | Mathieu et al. ............ | 358/342 |
| 4,593,329 | 6/1986 | Hayakawa ................... | 360/78 X |
| 4,608,613 | 8/1986 | Miyake ....................... | 360/77 X |

OTHER PUBLICATIONS

Porter et al., "Head-to-Track Synchronizing Mechanism for Magnetic Disks", IBM Tech. Disc. Bul., vol. 19, No. 4, Sep. 1976, pp. 1393-1395.

*Primary Examiner*—Donald McElheny, Jr.
*Attorney, Agent, or Firm*—Akoo - Toren

[57] ABSTRACT

In an information signal reproducing apparatus having a reproducing head for reproducing information signals from recording tracks formed on a record bearing medium and a shifting device for shifting the reproducing head athwart the tracks, the shifting device is arranged to be operatable in a first operating mode in which the reproducing head is shifted to a predetermined extent for every first predetermined period and also in a second operating mode in which the reproducing head is shifted to the predetermined extent for every second predetermined period which is longer than the first period. The shifting device is controlled not on the basis of the output of the reproducing head in the first mode but on the basis of the output of the reproducing head in the second mode.

20 Claims, 4 Drawing Sheets

TRACKING CONTROL ARRANGEMENT FOR INFORMATION SIGNAL REPRODUCING APPARATUS

This is a continuation application of Ser. No. 07/355,055, filed May 15, 1989, abandoned; which is a continuation application of Ser. No. 07/217,043, filed Jul. 7, 1988, abandoned; and which is a continuation application of Ser. No. 06/756,061, filed Jul. 17, 1985, abandoned.

BACKGROUND OF THE INVENTION

1. Field of the Invention

This invention relates to an information signal reproducing apparatus adapted for reproduction of information signals from recording tracks formed on a record bearing medium.

2. Description of the Prior Art

Reproduction of video signals from, for example, a record bearing medium having a plurality of information recording tracks formed thereon in concentric circles, requires a reproducing head to be under tracking control, the precision of which must be increased, accordingly, as the adjoining tracks are more closely spaced for increased recording density.

However, the record bearing medium expands or contracts according to changes in the ambient conditions, such as temperature and humidity. Besides, the positions of the recording tracks vary with differences between the recording apparatuses used.

Therefore, even in cases where a reproducing apparatus for reproducing information signals from such recording tracks is arranged to have a reproducing head positioned at a predetermined point, there inevitably arises some positional discrepancy between the reproducing head and the track. This discrepancy has prevented production of recorded signals in a satisfactory manner. To solve this problem, it has been proposed to perform tracking control by adjusting the position of a reproducing head on the basis of the reproduction output of the reproducing head. In one example of such prior art methods, the reproducing head is minutely vibrated and coincidence- between the vibration frequency and the fluctuating frequency of the reproduction output is arranged to be detected. However, this method necessitates an extremely complex structural arrangement.

Meanwhile, there has been contrived a system, wherein, in cases where different information signals are to be recorded in different tracks, these tracks are numbered and a reproducing apparatus is arranged to designate an applicable track number in obtaining a desired information signal.

However, in the event of a low reproduction output level of the reproducing head or in the event of absence of any signal in the designated record track, reproduction tracking under the above-stated shifting control would cause the reproducing head to be excessively shifted over to another track located adjacent to the applicable one. In that event, the track numbers get out of control. A reproduced track then differs from a designated track. Once such a discrepancy arises, it is no longer possible to designate a reproducing track number from outside unless a track number is written in each of the record tracks.

SUMMARY OF THE INVENTION

It is an object of this invention to provide an information signal reproducing apparatus which is capable of rendering a good reproduced signal by solving the above-stated problems of the prior art apparatuses.

It is another object of this invention to provide an information signal reproducing apparatus which is capable of performing accurate tracking with a simple structural arrangement.

Under these objects, an information signal reproducing apparatus, arranged as a preferred embodiment of this invention, comprises: reproducing means for reproducing information signals from tracks formed on a record bearing medium; shifting means for shifting the reproducing means; across the tracks, the shifting means being arranged to be operable in a first mode, in which the reproducing means is shifted to a predetermined extent for every first predetermined period and also in a second mode, in which the reproducing means is shifted to the predetermined extent for every second predetermined period which is longer than the first predetermined period; and control means for controlling the shifting means, without using the output of the reproducing means when the shifting means is in the first mode, but by using the output of the reproducing means when the shifting means is in the second mode.

It is a further object of this invention to provide an apparatus for reproducing information signals which is capable of accurately detecting track numbers in reproducing information signals from a record bearing medium having predetermined track numbers assigned to a plurality of information signal recording tracks formed thereon.

Under this object, an information signal reproducing apparatus, arranged as an embodiment of this invention, comprises reproducing means for reproducing information signals from tracks formed on the record bearing medium; shifting means for shifting the reproducing means across the tracks; detecting means for detecting that the reproducing means has been shifted by the shifting means from an initial position thereof to a predetermined shifting extent; and control means for controlling the shifting means to have the reproducing means brought back to the initial position on the basis of the output of the detecting means.

These and further objects and features of the invention will become apparent from the following detailed description of a preferred embodiment thereof taken in conjunction with the accompanying drawings.

DETAILED DESCRIPTION OF THE PREFERRED EMBODIMENT

In the following example, this invention is applied to a reproducing apparatus arranged to reproduce a video signal in the form of a still picture from a disc shaped magnetic sheet on which each of a plurality of recording tracks formed thereon has a one-frame or one-field portion of the video signal recorded therein.

Figure 1:
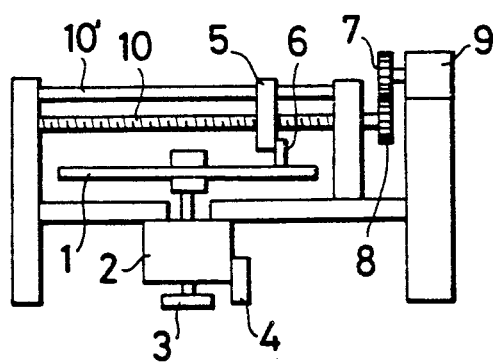
FIG. 1 is a sectional view of a reproducing apparatus arranged as an embodiment of this invention.

FIG. 1 shows, in a sectional view, a reproducing apparatus arranged as an embodiment of this invention. Referring to the drawing, a disc shaped magnetic sheet 1 is employed as a record bearing medium. A sheet motor 2 is arranged to rotate the magnetic sheet 1. A rotating body 3 is attached to the shaft of the sheet motor 2 and has a permanent magnet mounted on a peripheral part thereof. A hall element 4 is arranged to detect, through the permanent magnet, the rotation of the sheet, motor 2 and to produce an output per turn of the sheet motor 2. A magnetic head 6 is mounted on a carriage 5. The reproducing apparatus includes toothed gears 7 and 8; a stepping motor 9; a screw shaft 10, which is arranged to move the carriage 5, accordingly, as the stepping motor 9 rotates; and a guide shaft 10' which is arranged to carry the carriage 5.

With the reproducing apparatus arranged in this manner, when the sheet motor 2 rotates, the magnetic sheet 1 rotates. The hall element 4 comes to confront the magnet on the rotating body 3 to produce a pulse output therefrom every time the sheet 1 makes one turn. A head feeding operation is controlled by the stepping motor 9. In this particular embodiment, the magnetic head 6 is arranged to be shifted to an extent of one track with 10 pulses applied to the stepping motor 9.

Figure 2:
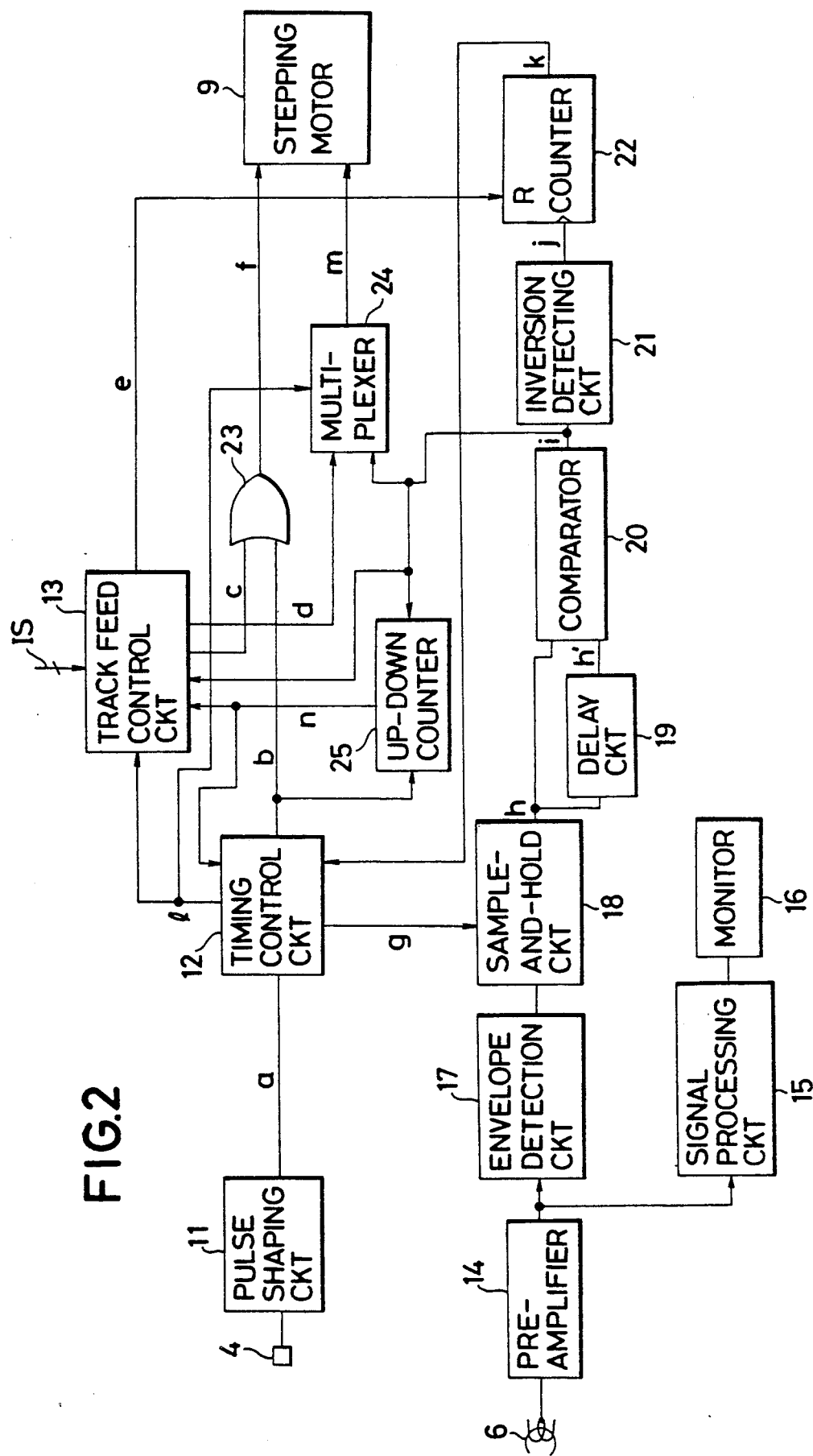
FIG. 2 is a block diagram showing, by way of example, the control circuit of the same reproducing apparatus.

FIG. 2 shows, by way of example, a control circuit for controlling the feeding and tracking operations on the head 6 shown in FIG. 1. Referring to FIG. 2, the circuit arrangement includes a pulse shaping circuit 11 which is arranged to shape the output of the hall element 4; a timing control circuit 12; a track feed control circuit 13 which is arranged to form a track feed signal by using a track moving instruction signal IS coming from outside; a pre-amplifier 14 which is arranged to amplify the output of the magnetic head 6; a signal processing circuit 15 which is arranged to form a television signal by signal processing the output of the pre-amplifier 14; a monitor 16 which displays the television signal; an envelope detection circuit 17; a sample-and-hold circuit 18; a delay circuit 19 which is arranged to delay the output of the sample-and-hold circuit 18 for the period of one turn of the sheet 1; a comparator 20; an inversion detecting circuit 21 which is arranged to detect the change of the output i of the comparator 20 from a low level (hereinafter referred to as an L level) to a high level (hereinafter referred to as an H level); a counter 22 which counts the number of occurrences of the inversion of the output level of the comparator 20; an OR circuit 23; a multiplexer 24; and an up-down counter 25 which is arranged to detect the shifting extent of the head 6.

Figure 3:
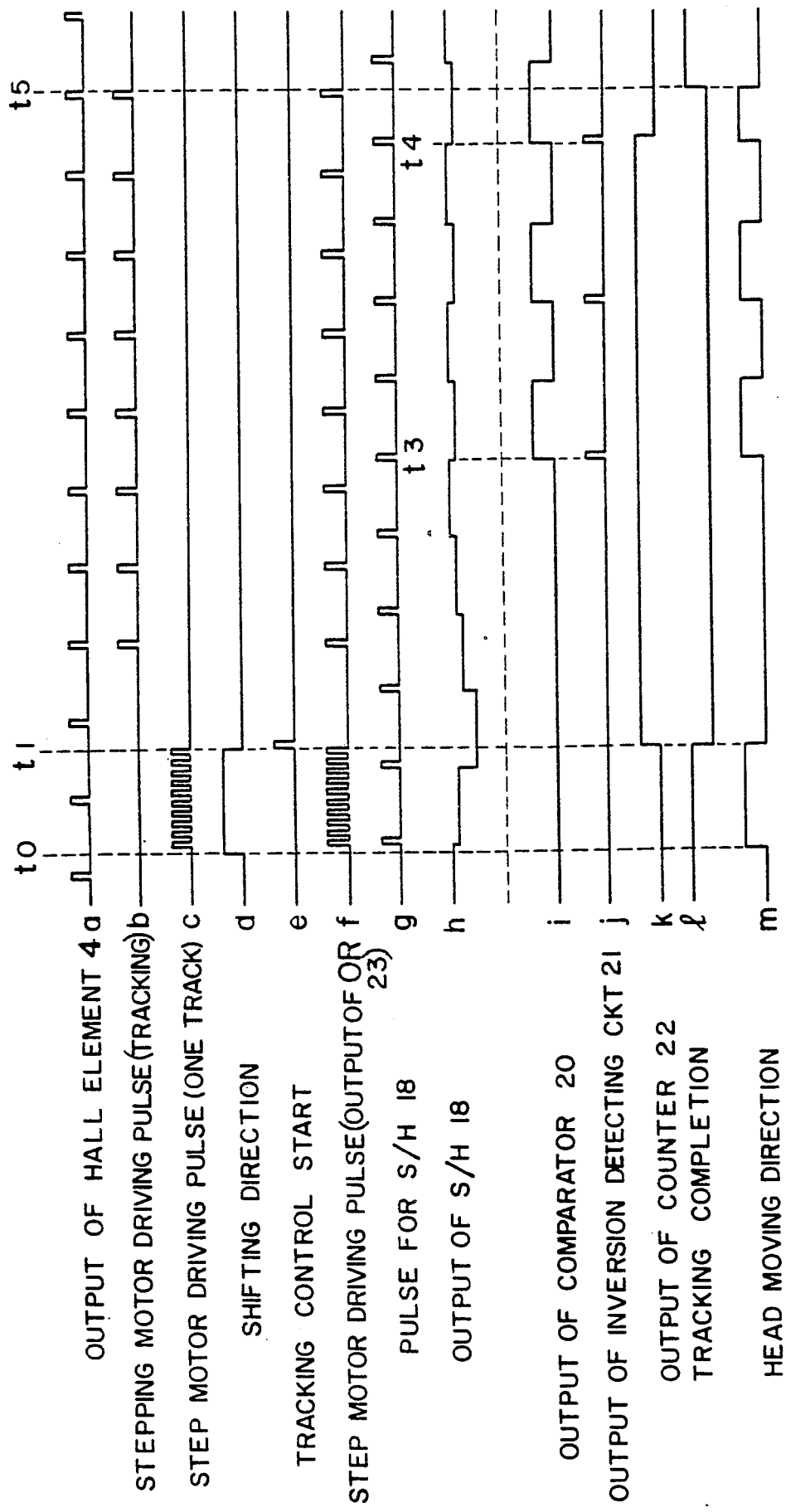
FIGS. 3 and 4a–4n are timing charts showing wave forms of the various parts indicated in FIG. 2.
Figure 4:
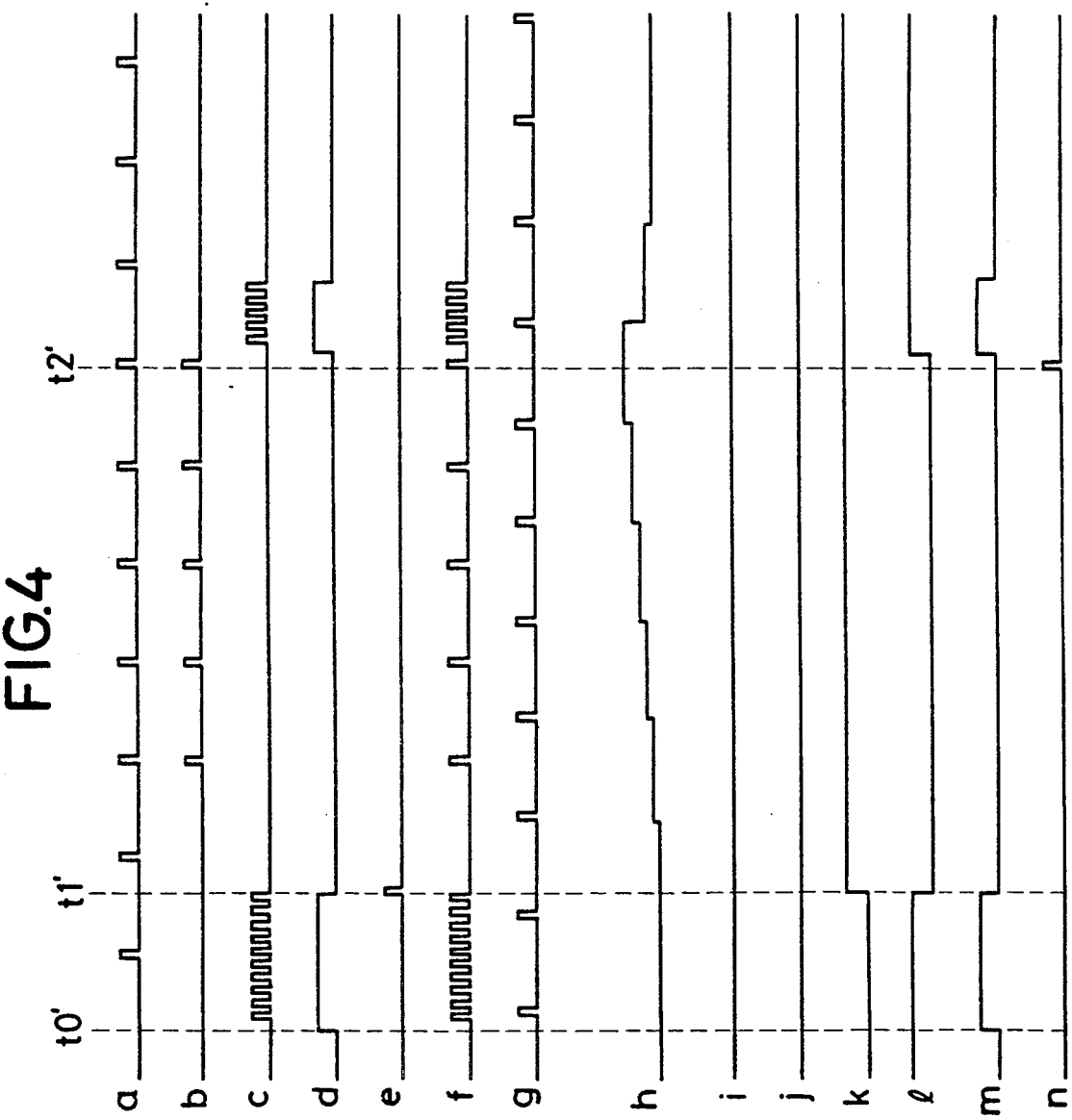

Referring to FIGS. 2, 3 and 4, a signal a is obtained in the form of a pulse signal by shaping the output of the hall element 4 and is supplied to the timing control circuit 12. A signal b consists of stepping motor driving pulses which are generated when tracking control is to be performed. A signal c consists of stepping motor driving pulses which are produced when the head 6 is to be shifted to the extent of one track. The number of pulses necessary for moving the head to the extent of one track is 10. A signal d is produced for showing the shifting direction of the head when it is to be shifted by one track. A signal e is a tracking control start instruction signal which becomes an H level upon completion of head shifting by one track. A signal f consists of stepping motor driving pulses which are produced from the OR circuit 23. A sampling pulse signal g is arranged to be supplied to the sample-and-hold circuit 18 and is obtained by delaying the pulse signal a for a predetermined length of time. An envelope hold signal h represents an envelope held by the sample-and-hold circuit. A signal i is produced from the comparator 20. When the signal i is at an H level, a hold signal h' preceding the present hold signal h by one turn is at a higher level than the present signal h. When the signal i is at an L level, the level of the present hold signal h is higher than the preceding signal h'. The signal i thus shows the moving direction of the head 6. A pulse signal j is produced when the inversion detecting circuit 21 detects the inversion of the signal i from an L level to an H level. A signal k is produced from the counter 22. When the inversion detection pulse signal j is counted three times, the counter 22 produces the signal k at an L level. The level of the signal k becomes H when the counter 20 is reset by the signal e. A signal l becomes an H level upon completion of tracking control and allows the head to be shifted to the extent of one track. A signal m indicates the moving direction of the head 6 selected by the multiplexer 24. A signal n is produced when the up-down counter 25 up counts, i.e. when the moving extent of the head 6 reaches an extent corresponding to 5 pulses which is a half of the number of pulses necessary for shifting the head to the extent of one track.

Under a normal condition, the embodiment operates as follows: A reproduced video signal from the magnetic head 6 is supplied via the pre-amplifier 14 to the envelope detection circuit 17 and the signal processing circuit 15. The signal processing circuit 15 converts the reproduced video signal into a television signal and displays it on the monitor 16.

Then, when the track shifting instruction signal IS comes from outside, the track feed control circuit 13 is actuated. As a result, ten pulses of the pulse signal c are applied via the OR circuit 23 to the stepping motor 9 at a point of time t0. Further, the signal d, which designates a track shifting direction, is produced from the multiplexer 24. At this time, the signal d has been selected by the multiplexer 24 according to the signal l. Therefore, the stepping motor 9 is driven to an extent corresponding to ten pulses in the direction designated by the signal d. This causes the head 6 to move to the extent of one track and thus comes to a position corresponding to a predetermined position. After the ten pulses of the signal c have been produced, the tracking control start pulse signal e is produced at a point of time t1. This pulse signal e resets the counter 22. The level of the tracking allowing signal k then becomes H. At the same time, the level of the track feed allowing signal l becomes L. Then, the one-track feeding operation is inhibited and the multiplexer 24 selects the signal i.

At the point of time t1, the tracking control operation thus begins in the following manner: The output of the envelope detection circuit 17 is sampled and held by the sample-and-hold circuit 18 according to the timing of the pulse signal g of the timing control circuit 12. The hold output h of the sample-and-hold circuit 18 is supplied to the comparator 20 and also to the delay circuit 19. The comparator 20 then compares the present hold signal output h with a hold signal output h' preceding the former by one turn. As a result of comparison, the signal i is produced from the comparator 20. The signal i is at an H level when the level of the hold signal output h' preceding by one turn is higher than the present hold signal output h and at an L level when the level of the preceding signal is lower. In other words, when the level of the hold signal h becomes an L level, the level of the signal i becomes an H level at the timing of the signal g. The high level signal i then inverts the rotating direction of the stepping motor 9. In case that the level of the hold signal h increases, the stepping motor 9 is rotated by the pulse signal b to make one turn per turn of the sheet 1. When the level of the signal i rises from L to H at a point of time t3, the moving direction of the stepping motor 9 is inverted. Then, at that instant, the inversion detection pulse signal j is produced. When the inversion detection pulse signal j is produced for the third time at a point of time t4, the level of the output k of the counter 22 becomes L. Then, a next pulse of the stepping motor driving pulse signal b is produced and the tracking control comes to an end. Upon completion of the tracking control, the level of the signal l becomes H to permit the head to be shifted to the extent of one track.

FIG. 4 shows the operation of the embodiment in case that: In shifting the head 6 from a non-recorded track TA having no video signal recorded therein to another non-recorded track TB, the absolute track position of the head 6 is deviating from the recording track while a video signal has been recorded in an adjacent track TC located in the deviating direction of the head 6. The operation in this case is as shown in a timing chart in FIG. 4. At a point of time t0', ten pulses of the timing pulse signal c are produced to shift the head from its initial position corresponding to the track TA to another position corresponding to the track TB. At this time, the hold signal h is almost at a zero level. With the head 6 shifted toward the track TC, a leak from the track TC is detected. The head 6 then begins to move toward the center of the track TC. In this instance, the up-down counter 25 counts the stepping motor driving pulses b from the time of commencement of tracking control. When the absolute counted value becomes 5 at a point of time t2', the pulse signal n is produced. The signal n is supplied to the timing control circuit 12 and the track feed control circuit 13. The timing control circuit 12 makes the level of the track feed allowing signal ( an H level. The multiplexer 24 selects the direction signal d. Further, the one track feed control circuit 13 then makes the level of the signal d an H level which is obtained by inverting the signal i produced at that time from the comparator 20. The circuit 13 also produces five pulses of the stepping motor driving pulse signal c to bring the head 6 back to the initial position thereof.

This arrangement effectively prevents the head 6 from being shifted to a track adjoining a designated desired track and from erroneously reproducing a video signal recorded in the adjoining track. Therefore, a track designated by the operator can be reliably searched out. Track numbers can be controlled without fail. Besides, in the event of a low signal level, the head is prevented from being excessively shifted.

In the case of this embodiment, the invention is applied to a reproducing apparatus arranged to perform reproduction from a disc-shaped magnetic sheet. However, in accordance with the invention, the record bearing medium is not limited to a magnetic sheet but it may be a medium of a different kind, such as an optical disc, etc. Further, the shape of the record bearing medium is not limited to a disc shape. The invention is applicable to reproduction from media of other shapes, such as a tape-shaped medium.

What is claimed is:

1. An information signal reproducing apparatus, comprising:
   (a) reproducing means for outputting a recorded signal from tracks formed on a record bearing medium;
   (b) shifting means for shifting the reproducing means across said tracks;
   (c) controlling means for controlling said shifting means, said controlling means having a first mode in which said reproducing means is shifted to a predetermined extent for every first predetermined period without using an output of said reproducing means, and a second mode in which said reproducing means is shifted to said predetermined extent for every second predetermined period which is no longer than said first predetermined period by using an output of said reproducing means; and
   (d) detecting means for detecting that an output of said reproducing means has not reached a predetermined level, wherein said controlling means changes over between said first mode and said second mode in accordance with a detecting result of said detecting means.

2. An apparatus according to claim 1, wherein said controlling means includes inverting means for inverting the shifting direction in which said reproducing means is shifted by said shifting means, said inverting means inverting the shifting direction according to a detection by said detecting means.

3. An apparatus according to claim 1, wherein said controlling means stops the shifting operation of said shifting means on said reproducing means, the stopping action of said controlling means being arranged to be effected on the basis of said detecting means.

4. An apparatus according to claim 1, wherein said detecting means includes a sampling circuit which samples an output of said reproducing means for every said second predetermined period.

5. An apparatus according to claim 4, further comprising driving means which drives said record bearing medium in such a manner that the information signal recorded in one track is reproduced during said second predetermined period by said reproducing means.

6. An apparatus according to claim 1, wherein said shifting means includes a circuit which generates trigger pulses arranged to shift said reproducing means to a predetermined extent at a time.

7. An apparatus according to claim 6, wherein said controlling means includes a counter circuit which counts said trigger pulses; a detecting circuit which detects that the counted value of said counter circuit reaches a predetermined value; and a control circuit which controls said shifting means on the basis of the output of said detecting circuit.

8. An information signal reproduction apparatus comprising:
   (a) reproducing means for reproducing information signals from tracks formed on a record bearing medium;
   (b) shifting means for shifting said reproducing means across said tracks;
   (c) means for controlling said shifting means, said controlling means having a first mode in which said reproducing means is shifted to a predetermined extent in a first direction or to the same extent in a second direction which is reverse to the first direction for every first predetermined period, and a second mode in which said reproducing means is shifted to said predetermined extent for every second predetermined period which is longer than said first predetermined period;
(d) means for detecting a reduction in an output of said reproducing means when said controlling means is in said first mode; and
(e) means for switching over the shifting direction in which said shifting means shifts said reproducing means in said first mode between said first and second shifting directions according to a detection by said detecting means.

9. An apparatus according to claim 8, wherein said detecting means is arranged to detect the reduction for every one of said first predetermined periods.

10. An apparatus according to claim 8, further comprising stopping means which stops the shifting operation of said shifting means when a switching action of said switching over means has been repeatedly performed a predetermined number of times.

11. An information signal reproducing apparatus comprising:
(a) reproducing means for reproducing information signals from tracks formed on a record bearing medium;
(b) shifting means for shifting said reproducing means across said tracks;
(c) means for detecting a reduction in an output of said reproducing means;
(d) first control means which is arranged to invert a reproducing means shifting direction of said shifting means according to detection of said detecting means;
(e) inversion detecting means for detecting that a number of said inversions has reached a predetermined number of times; and
(f) second control means which stops said shifting means from shifting said reproducing means according to a detection by said inversion detecting means.

12. An apparatus according to claim 11, wherein said shifting means is arranged to be capable of shifting said reproducing means at a first average speed and also at a second average speed which is lower than said first average speed.

13. An apparatus according to claim 12, wherein said first and second control means are arranged to be operable while said reproducing means is being shifted at said second average speed.

14. An information signal reproducing apparatus, comprising:
a) reproducing means for reproducing information signals from tracks formed on a record bearing medium;
b) shifting means for shifting said reproducing means stepwisely with each shifting step being shorter than a width of each of said tracks;

c) discriminating means for discriminating that said reproducing means has been shifted by said shifting means from an initial position thereof to a predetermined extent; and
d) controlling means for controlling said shifting means to have the reproducing means brought back to a predetermined position in accordance with an outer level of said reproducing means that is less than a predetermined level, said discriminating means discriminates that said reproducing means has been shifted to said predetermined extent.

15. An apparatus according to claim 14, wherein said shifting means includes driving means for driving said reproducing means to a predetermined extent at a time; and a trigger pulse generating means for generating trigger pulses which trigger said driving means.

16. An apparatus according to claim 15, wherein said detecting means includes a counter circuit which counts said trigger pulses.

17. An apparatus according to claim 15, wherein said controlling means includes inverting means for inverting an moving direction of said driving means according to a output of said detecting means; and means for causing said trigger pulse generating means to generate a number of trigger pulses corresponding to said predetermined shifting extent after the operation of said inverting means.

18. An information signal reproducing apparatus, comprising:
a) reproducing means for reproducing information signals from tracks formed on a record bearing medium;
b) shifting means for intermittently shifting the reproducing means across said tracks, said shifting means being arranged to be operable in a first mode in which said reproducing means is shifted to a predetermined extent for every first predetermined period and also in a second mode in which said reproducing means is shifted to said predetermined extent for every second predetermined period which is longer than said first predetermined period; and
c) control means for controlling said shifting means without using the output of said reproducing means when said shifting means is in said first mode but by using the output when said shifting means is in said second mode.

19. An apparatus according to claim 18, wherein said shifting means includes a circuit which generates trigger pulses arranged to shift said reproducing means to a predetermined extent at a time.

20. An apparatus according to claim 18, wherein said control means is arranged to control said shifting means on the basis of the signal outputted from said reproducing means during said predetermined period at a time of shifting said recording means in said second mode.

* * * * *